United States Patent
Chan

(10) Patent No.: US 8,112,132 B2
(45) Date of Patent: Feb. 7, 2012

(54) MOBILE DEVICE HAVING CORD RETRACTOR

(75) Inventor: Yuet Ming Chan, Tsuen Wan (HK)

(73) Assignee: Yuet Ming Chan, Tsuen Wan (HK)

( * ) Notice: Subject to any disclaimer, the term of this patent is extended or adjusted under 35 U.S.C. 154(b) by 227 days.

(21) Appl. No.: 12/641,584

(22) Filed: Dec. 18, 2009

(65) Prior Publication Data

US 2011/0151941 A1 Jun. 23, 2011

(51) Int. Cl.
*H04M 1/00* (2006.01)

(52) U.S. Cl. ........ 455/575.2; 455/569.1; 455/569.2; 455/575.1; 455/575.6; 455/90.3; 455/347; 455/348; 379/420.01; 379/420.02; 379/420.03; 379/420.04; 379/428.02; 379/430; 379/431

(58) Field of Classification Search ........ 455/41.1–41.2, 455/569.1–569.2, 574, 575.1–575.2, 575.6, 455/90.1–90.3, 100, 347–350; 379/420.01–420.04, 379/421–422, 428.01–428.02, 430–431, 379/433.02–433.03
See application file for complete search history.

(56) References Cited

U.S. PATENT DOCUMENTS

| 3,715,526 | A * | 2/1973 | Blanch et al. ............ 191/12.2 R |
| 6,731,956 | B2 * | 5/2004 | Hanna et al. ............... 455/569.1 |
| 7,151,912 | B1 | 12/2006 | Morrison |
| 7,515,706 | B2 * | 4/2009 | Park .............................. 379/430 |
| 7,891,596 | B2 * | 2/2011 | Holbein et al. ............ 242/382.1 |
| 2003/0165237 | A1 * | 9/2003 | Farr et al. ..................... 379/430 |
| 2003/0224839 | A1 | 12/2003 | Takahashi et al. |
| 2007/0121985 | A1 | 5/2007 | Park |
| 2007/0218962 | A1 | 9/2007 | Tsai |
| 2008/0161067 | A1 * | 7/2008 | Reda et al. ................ 455/569.1 |
| 2008/0287166 | A1 | 11/2008 | Lin |

FOREIGN PATENT DOCUMENTS

WO 2009/082357 7/2009

OTHER PUBLICATIONS

Search Report for UK Patent Application No. 1001866.1, Mar. 2010.

* cited by examiner

*Primary Examiner* — Tuan A Tran

(57) ABSTRACT

A mobile device, particularly a wireless headset, includes a cord to which an earpiece is fixed and a module having a spring-actuated retractor reel into which the cord is retracted for storage. A fastener on the module makes the device wearable. A rotary encoder generates a position data output according to the rotational position of the reel, and a controller receives the position data output from the sensor, and, in response, controls a function such as placing the device in an on-hook or off-hook state.

7 Claims, 4 Drawing Sheets

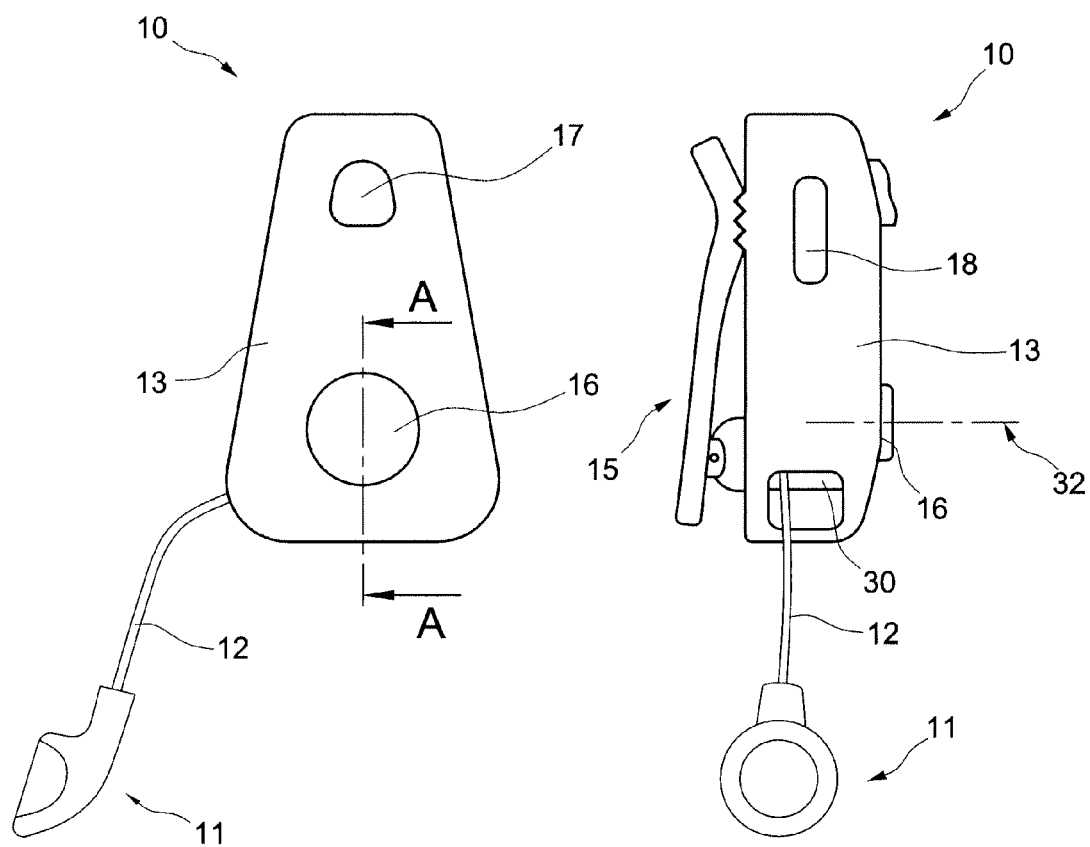

MOBILE DEVICE HAVING CORD RETRACTOR

TECHNICAL FIELD

The present invention relates generally to mobile devices, and more particularly to mobile devices with cord retractors.

BACKGROUND OF THE INVENTION

Mobile devices, such as cellular telephones, personal data assistants (PDAs), media players etc., continue to increase in popularity. To maintain this trend, manufacturers continue to explore ways to make mobile devices appeal to a larger part of the population. One object of the invention is to address a need for improvements in the ease of use of such devices, by automating aspects of their operation to make performing different functions with the device simpler or more intuitive.

Headsets are used with many mobile devices to free-up a user's hands leaving them free to perform other tasks, such as driving, etc and are also advantageous in noisy environments. As a result, headsets increase the convenience of using a mobile device. With many mobile devices, the audio signal is outputted through a headset having one or more earpieces connected by an electrical cord to an output jack on the device. An improvement to this is to have a cord retractor in the device, as this provides many advantages. It allows for convenient storage of the cord, it allows a variable length of cord to be deployed as required to avoid snagging, tangling, or like problems and it also prevents headsets from being misplaced when not utilized or when not plugged into the mobile device. Another area of focus with mobile devices is hands-free wireless communications where headsets communicate with a local mobile device via a local wireless network. Such headsets have elements in common with other mobile audio devices, but a particular application is telephone communications. A further object of the invention is to address a need for improvements in the ease of use of audio devices of this type.

DISCLOSURE OF THE INVENTION

According to one aspect of the present invention there is provided a mobile device comprising: a cord having inner and outer sections; a retractor into which the cord is retracted for storage, the retractor including a fixture holding the inner section; a sensor adapted to generate a position data output related to the position of the fixture; a controller that receives the position data output from the sensor, and, in response, controls a function of the device.

Preferably the device comprises a portable audio device for providing an audio output signal, the retractor comprises a reel for winding up the cord and spring means for biasing the reel to wind the cord onto the reel; the sensor comprises a rotary encoder that generates the position data output according to the rotational position of the reel, the cord comprises flexible conductors for transmitting the audio output signal, and further comprising an earpiece coupled to the outer section of the cord for projecting audible signals to a user in response to the audio output signal.

Alternatively, for instance, the cord may provide a tether for securing a stylus to the mobile device. The mobile device may include a stylus-operated input, such as a touch-sensitive pad, for inputting text into the device. The sensor may comprise a two-position switch actuated by the cord to move between a first position when the cord is extended and a second position when the cord is retracted. The function of the device controlled by the controller in response to the position data output determined by the controller according to the position of the switch may include actuation of the touch-sensitive pad so as to display input from the pad upon a screen of the device.

Preferably the function of the device comprises activating or deactivating the audio device to transmit the audio output signal to the earpiece. Optionally, if the audio device further includes a main speaker, the function of the device includes activating or deactivating the main speaker.

Preferably the mobile audio device is adapted for two-way telephone communication and comprises a wireless headset having a microphone for receiving audible signals from a user, a wireless interface to interface the earpiece and microphone with a terminal, and wherein the function of the device comprises automatically placing the wireless headset in an on-hook or off-hook mode in response to the position data output.

Preferably the mobile audio device has an associated housing in which the reel, spring means, microphone and wireless interface are disposed, the rotary encoder comprises a non-contact sensor, and fastening means on the housing for securing the housing to a user. Preferably the fastening means includes a spring clip, most preferably the clip having teeth for engaging teeth on the housing. Alternatively, the fastening means may include an aperture in the housing for fastening a lanyard, or the like.

Optionally the device further includes a plurality of teeth circumferentially spaced about the reel, a pawl slidably fixed in the housing and moveable between an engaged position in engagement with the teeth to prevent the spring winding in the cord while allowing the cord to be extended from the reel, and a disengaged position allowing the spring to retract the cord and a button mounted to the housing for moving the pawl between the engaged and disengaged positions. Optionally, other known ratchet-type mechanisms for allowing unwinding of a retractor reel and selectively latching to prevent winding up of the reel may be employed.

Preferably the rotary encoder comprises at least one discontinuity provided in a circumferential surface on the reel and a Hall-effect sensor arranged with respect to the at least one discontinuity so as to enable each one of the at least one discontinuities to exert a characteristic magnetic influence upon the Hall-effect sensor during reel rotation. It will be appreciated that other types of non-contact sensor, such as optical sensors, may be employed to provide the position data output.

Preferably the reel further includes slip rings through which the audio output signal is transmitted and each one of the at least one rotor discontinuities further comprises a recessed area formed in one of the slip rings. Each one of the at least one rotor discontinuities may exhibit magnetic properties.

In another aspect the invention provides a mobile device comprising a mobile terminal and a wireless headset having a microphone for receiving audible signals from a user, a wireless interface to interface the earpiece and microphone with the mobile terminal, and wherein the function of the device comprises automatically connecting or disconnecting communication between the mobile terminal and the wireless headset in response to the position data output.

The mobile terminal may not include a speaker and microphone and therefore be incapable of communicating audible signals with a user except in conjunction with the wireless headset.

BRIEF DESCRIPTION OF THE DRAWINGS

Preferred forms of the present invention will now be described by way of example with reference to the accompanying drawings, wherein:

FIG. 1 is a schematic front view of a headset according to an exemplary embodiment of the invention.

FIG. 2 is a schematic side view of the headset of FIG. 1.

DESCRIPTION OF THE PREFERRED EMBODIMENTS

Figure 3:
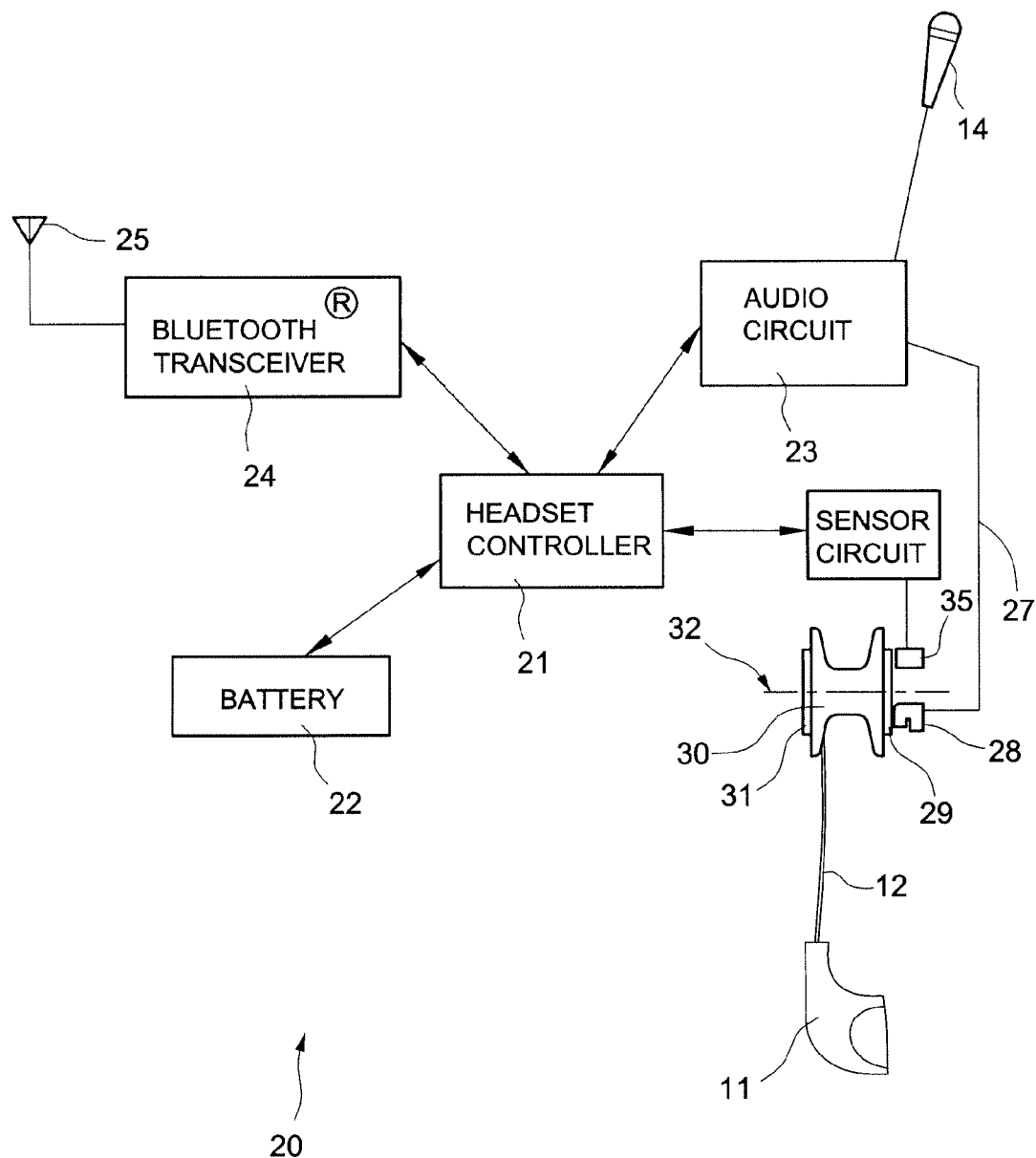
FIG. 3 is a schematic block diagram of the headset of FIG. 1.

FIGS. 1-3 illustrate an exemplary mobile device comprising a wireless headset 10 according to the present invention, having an earpiece 11 fixed to a cord 12 retractable from a housing 13. While the present invention is described in terms of a wireless headset 10 for telephone use, those skilled in the art will appreciate that the present invention is not limited to telephone communication, and is applicable to wireless headsets for use with any device. Likewise the headset itself may include a device such as a cellular telephone, a Media Player, a Personal Digital Assistant (PDA), a conventional laptop and/or palmtop computer, or any other mobile device that is used with an earpiece.

The wireless headset 10 is a hands-free communication device that enables a user to communicate with a cellular telephone using a wireless interface. In exemplary embodiments, the wireless interface comprises a short-range wireless network, particularly a Bluetooth® network. A Bluetooth® network is a radio interface that enables two or more wireless devices to communicate wirelessly over a short-range. However, the present invention is not limited to Bluetooth® networks and is applicable to any wireless interface with a wireless headset 10.

The wireless headset 10 generally includes an earpiece 11 for projecting audible signals to a user, a microphone 14 for receiving audible signals from the user, and a fastener for securing the wireless headset 10 to the person or clothing of a user, such as a spring-closed pivoted clip 15. A release button 16 is mounted to the housing 13, together with a multi-function push-button 17 for controlling functions such as pairing with the cellular telephone. A slider control 18 is provided for audio output volume control and, like the multi-function push-button 17 is associated with the headset controller 21.

In FIG. 3 each illustrated electronic component of wireless headset 10 is shown as a separate element or block, however, those skilled in the art will appreciate that two or more of these electronic components may be combined into a single microprocessor, application specific integrated circuit, or other suitable circuit.

The wireless headset 10 includes headset electronics 20 including a headset controller 21 for controlling the headset electronics 20, and which may include a processor and memory for storing data. A battery 22 provides power to the headset electronics 20. Headset electronics 20 further include an earpiece 11 for projecting audible signals to a user, microphone 14 for receiving audible signals from the user, and an audio circuit 23. Audio circuit 23 processes audio signals received from the cellular telephone according to known methods, and provides the processed audio signals to earpiece 11 for projection to the user. Audio circuit 23 further processes audible signals received by microphone 14 according to known methods, and forwards the processed audio signals to the cellular telephone. As discussed further below, audio circuit 23 transmits/receives audio signals to/from the cellular telephone via a wireless interface. To that end, headset electronics 20 further include a wireless transmitter, such as a Bluetooth® transceiver 24 and antenna 25 for communicating with the cellular telephone via the wireless interface according to instructions provided by headset controller 21. The cooperation between the headset controller 21, Bluetooth® transceiver 24 and the cellular terminal with which it communicates are conventional, except as described herein, and so are not described in detail.

The audio circuit 23 transmits an audio output signal via conductors 27 to contacts 28 which maintain contact with the slip rings 29 fixed to the reel 30. The retractor reel 30 for winding up the cord 12 rotates about an axis 32 concentric with the release button 16. A spiral wound spring 31 is received in an annular recess in the reel 30 and has one end connected to the reel, and the other end connected to the housing so that the spring 31 biases the reel 30 to wind the cord 12. A Hall-effect sensor 35 lies adjacent the reel 30, and is connected via a sensor circuit 34 to the controller 21, thereby providing in this application an off-hook detector for the headset.

Figure 4:
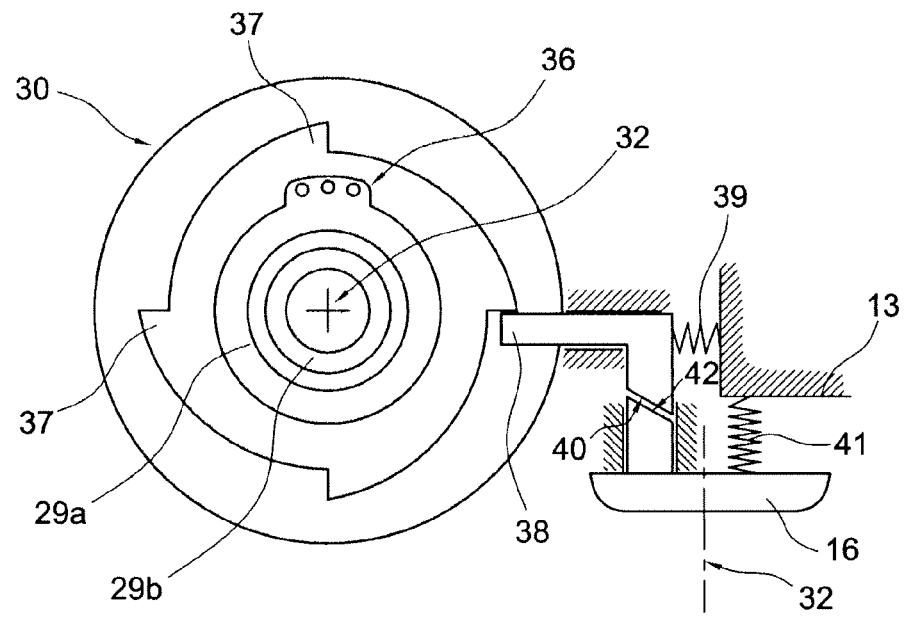
FIG. 4 is a schematic of the reel of the headset of FIG. 1, showing the latching mechanism.
Figure 5:
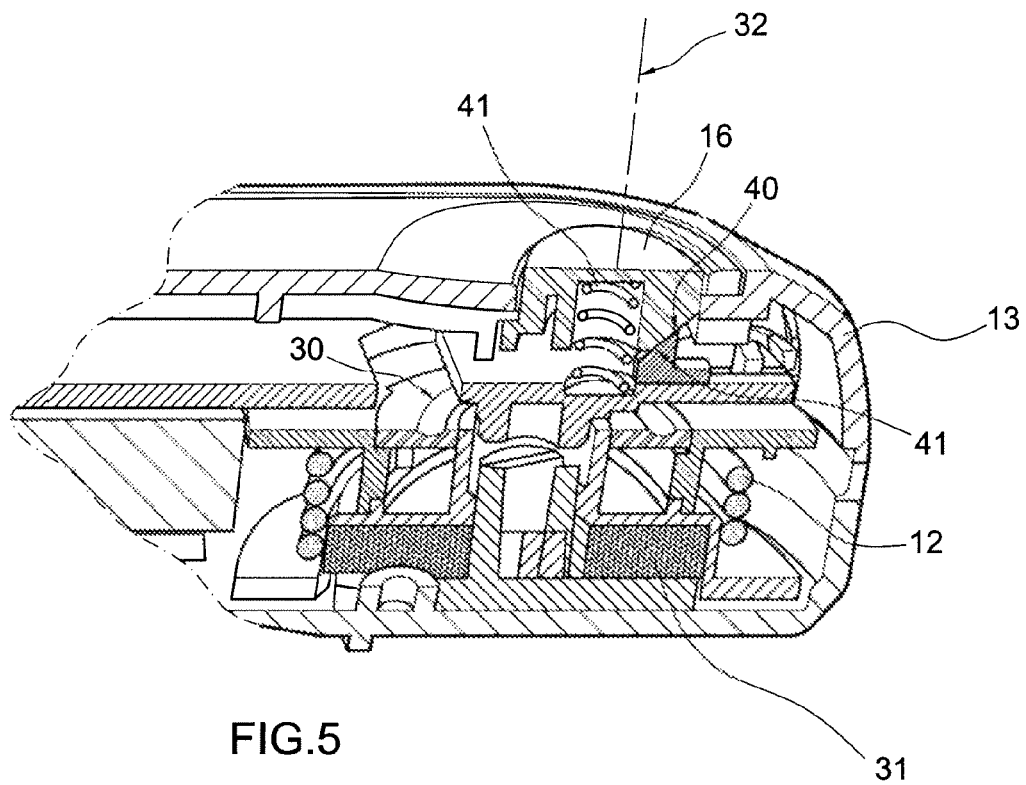
FIG. 5 is a fragmentary section along a plane obliquely intersecting the plane AA in FIG. 1.

As best seen in FIG. 4, the slip rings 29 include outer and inner slip rings 29a and 29b, concentric with axis 32 and formed as by etching on a printed circuit board substrate (not shown). In the outer periphery of the outer slip ring 29a a lobe is formed in which apertures are provided, thereby providing a discontinuity 36 in a circumferential surface on the reel 30. The discontinuity 36 exerts a characteristic magnetic influence upon the Hall-effect sensor 35 during reel rotation, providing a rotary encoder that generates the position data output according to the rotational position of the reel which is transmitted to the headset controller 21.

The reel 30 further includes an integral ratchet wheel including a plurality of teeth 37 circumferentially spaced about the reel, the teeth being tapered to cooperate with a pawl 38 slidably fixed in the housing 13. The pawl 38 is moveable between the engaged position shown, where it engages with the teeth 37 to prevent the spring 31 winding in the cord 12, while at the same time allowing the cord 12 to be extended from the reel 31, and a disengaged position (not shown) allowing the spring 31 to retract the cord 12. The pawl 38 has a tapered face 40 and abuts a first spring 39 urging the pawl to engage the teeth 37. The release button 16 is abutted by a second spring 41 which slidably urges the button 16 out of the housing 13. A tapered face 42 on the button 16 is complementary to the face 40 with which it engages when the button 16 is pressed to move the pawl 38 to its disengaged position.

Figure 6:
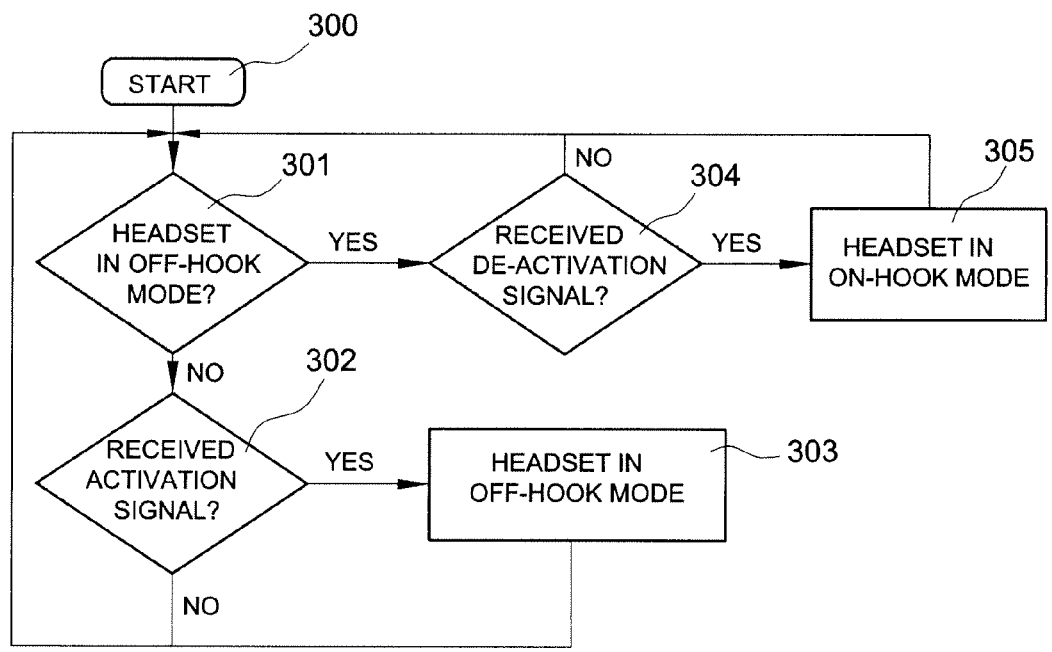
FIG. 6 illustrates an exemplary method of operating the headset of FIG. 1.

Referring now to FIG. 6, an exemplary method of operation of the off-hook detector of the headset will be described. Headset electronics 20 begins the headset detection loop (Block 300) at any appropriate time, i.e. when headset electronics 20 powers up. The headset controller 21 then determines if the headset 10 is in an off-hook mode (Block 301). In the off-hook mode the headset is off-hook, indicating a call is in progress, i.e., a call has been answered or made, in which case the audio circuit 23 is activated, transmitting an audio output signal to the earpiece 11. If not in the off-hook mode the headset is in an on-hook mode, ready to receive or make a call, in which case the audio circuit 23 is deactivated, and therefore unable to transmit an audio output signal to the earpiece 11. If the controller 21 determines that the headset is not in an off-hook mode (as, for instance, immediately following power up) the controller 21 determines if an activation signal has been received from the sensor circuit 34 (Block 302). The activation signal may comprise a predetermined number of pulses received from the Hall-effect sensor 35 and counted by the controller. If an activation signal has been received from the sensor circuit 34, the controller 21 activates the audio circuit 23 to put the headset 10 in an off-hook mode—for instance, to answer a call (Block 303). If the controller 21 (at Block 301) determines that the headset 10 is in an off-hook mode, the controller 10 then determines whether a de-activation signal has been received from the sensor circuit 34 (Block 304). The deactivation signal may comprise the same predetermined number of pulses received from the Hall-effect sensor 35 as the activation signal, or a different number of pulses. If a deactivation signal has been received from the sensor circuit 34, the controller 21 deactivates the audio circuit 23 to put the headset 10 in a on-hook mode—for instance, to end a call (Block 305).

The above discloses a wireless headset 10 that is effective and efficient in operational use particularly for performing a telephone call over a local wireless network, by automatically putting the device in an on-hook or off-hook state, upon extension of the cord 12 from the retractor or winding up of the cord 12 into the retractor. This simplifies the operation of the device and allows it to be readily used, without need to be versed in an operation technique. Moreover, the device may be economically constructed and has an overall simple design which minimizes manufacturing costs.

Aspects of the present invention have been described by way of example only and it should be appreciated that modifications and additions may be made thereto without departing from the scope thereof.

The invention claimed is:
1. A mobile device comprising:
a cord having inner and outer sections;
a retractor into which the cord is retracted for storage, the retractor including a fixture holding the inner section;
a sensor adapted to generate a position data output related to the position of the fixture;
a controller that receives the position data output from the sensor, and, in response, controls a function of the device;
a portable audio device for providing an audio output signal,
wherein the retractor comprises a reel for winding up the cord and spring means for biasing the reel to wind the cord onto the reel; the sensor comprises a rotary encoder that generates the position data output according to the rotational position of the reel, the cord comprises flexible conductors for transmitting the audio output signal, and further comprising an earpiece coupled to the outer section of the cord for projecting audible signals to a user in response to the audio output signal;
the rotary encoder comprises at least one discontinuity provided in a circumferential surface on the reel and a Hall-effect sensor arranged with respect to the at least one discontinuity so as to enable each one of the at least one discontinuities to exert a characteristic magnetic influence upon the Hall-effect sensor during reel rotation;
the reel further includes slip rings through which the audio output signal is transmitted and each one of the at least one rotor discontinuities further comprises a recessed area formed in one of the slip rings.

2. The mobile device of claim 1 wherein the function of the device comprises activating or deactivating the audio device to transmit the audio output signal to the earpiece.

3. The mobile device of claim 1 wherein the mobile audio device is adapted for two-way telephone communication and comprises a wireless headset having a microphone for receiving audible signals from a user, a wireless interface to interface the earpiece and microphone with a terminal, and wherein the function of the device comprises automatically placing the wireless headset in an on-hook or off-hook mode in response to the position data output.

4. The mobile device of claim 3 further including a housing in which the reel, spring means, microphone and wireless interface are disposed, the rotary encoder comprises a non-contact sensor, and fastening means on the housing for securing the housing to a user.

5. The mobile device of claim 4 wherein the fastening means includes a spring clip.

6. The mobile device of claim 1 further comprising a plurality of teeth circumferentially spaced about the reel, a pawl slidably fixed in the housing and moveable between an engaged position in engagement with the teeth to prevent the spring winding in the cord while allowing the cord to be extended from the reel, and a disengaged position allowing the spring to retract the cord and a button mounted to the housing for moving the pawl between the engaged and disengaged positions.

7. The mobile device of claim 1 wherein each one of the at least one rotor discontinuities exhibits magnetic properties.

* * * * *